United States Patent
O'Neil et al.

(10) Patent No.: US 6,960,641 B2
(45) Date of Patent: Nov. 1, 2005

(54) METHOD OF MAKING BLOCK COPOLYMERS BY SOLID STATE POLYMERIZATION

(75) Inventors: Gregory Allen O'Neil, Clifton Park, NY (US); James Day, Scotia, NY (US); Daniel Joseph Brunelle, Burnt Hills, NY (US); Joseph Anthony Suriano, Clifton Park, NY (US); Patrick Joseph McCloskey, Watervliet, NY (US); Paul Michael Smigelski, Jr., Schenectady, NY (US)

(73) Assignee: General Electric Company, Nishayuna, NY (US)

(*) Notice: Subject to any disclaimer, the term of this patent is extended or adjusted under 35 U.S.C. 154(b) by 0 days.

(21) Appl. No.: 10/743,241

(22) Filed: Dec. 22, 2003

(65) Prior Publication Data

US 2004/0138383 A1 Jul. 15, 2004

Related U.S. Application Data

(62) Division of application No. 10/000,913, filed on Nov. 2, 2001, now abandoned.

(51) Int. Cl.[7] ............................................... C08G 64/00
(52) U.S. Cl. ....................... 528/196; 528/198; 528/271; 528/272; 568/716; 568/717; 568/722
(58) Field of Search ................................. 528/196, 198, 528/271, 272; 568/716, 722; 525/461, 462, 389, 390, 191, 182

(56) References Cited

U.S. PATENT DOCUMENTS

| 4,323,668 | A | | 4/1982 | Brunelle |
|---|---|---|---|---|
| 5,717,056 | A | | 2/1998 | Varadarajan et al. |
| 5,905,135 | A | | 5/1999 | Idage et al. |
| 6,031,063 | A | | 2/2000 | Day et al. |
| 6,143,859 | A | * | 11/2000 | Chatterjee et al. .......... 528/196 |
| 6,518,391 | B1 | * | 2/2003 | McCloskey et al. ........ 528/196 |

* cited by examiner

*Primary Examiner*—Tatyana Zalukaeva
(74) *Attorney, Agent, or Firm*—Andrew J. Caruso; William E. Powell, III

(57) ABSTRACT

A method of preparing block copolymers by solid state polymerization is described. A mixture of a partially crystalline polycarbonate having activated terminal aryloxy groups, for example terminal methyl salicyl groups, when heated together with an oligomeric polyester having reactive terminal hydroxy groups under solid state polymerization conditions affords block copolymers. The activated terminal aryloxy groups play a key role in preserving the block lengths of the starting materials. A control sample in which the partially crystalline polycarbonate lacks activated terminal aryloxy groups, for example polycarbonates substituted by phenol, affords a much lower molecular weight, more highly randomized copolymer product. The product block copolymers are useful as "weatherable" plastic materials.

23 Claims, No Drawings

METHOD OF MAKING BLOCK COPOLYMERS BY SOLID STATE POLYMERIZATION

This application is a division of application Ser. No. 10/000,913, filed Nov. 2, 2001, which is hereby incorporated by reference in its entirety now abandoned.

BACKGROUND OF THE INVENTION

This invention relates to a method of copolymer preparation by solid state polymerization. More particularly the method relates to the preparation of block copolymers incorporating polycarbonate and polyester structural units by solid state polymerization.

Block copolymers are prized for the degree to which polymer physical properties are determined by polymer structure. Block copolymer structure may be varied by adjusting the monomers constituting the blocks, the length of the blocks, and the number of blocks per copolymer molecule. Block copolymers prepared from two different difunctional, mutually reactive oligomers, for example an oligomeric diacid chloride and an oligomeric diol, are referred to as multiblock copolymers and possess a structure in which there are multiple blocks comprising the structural units of the first oligomer alternating with blocks comprising the structural units of the second oligomer. The physical properties of multiblock copolymers may be adjusted through careful control of the block length of the starting oligomers and the choice of a synthetic method which preserves the block length of the starting oligomers in the final multiblock copolymer.

Block copolymers incorporating polycarbonate and polyester structural units, block copolyestercarbonates, have demonstrated effectiveness as UV resistant thermoplastics and hold promise as "weatherable" plastic materials for use in applications in which resistance to the elements is required. Block copolyestercarbonates are typically prepared by reaction of at least one aromatic dihydroxy compound with at least one aromatic dicarboxylic acid dichloride in the presence of water and a solvent such as methylene chloride, an acid acceptor such as sodium hydroxide, and an amine catalyst such as triethylamine to produce a hydroxy-terminated oligomeric polyester. The hydroxy-terminated oligomeric polyester is then further reacted with an additional source of carbonate units, for example phosgene, under interfacial conditions analogous to those used in making polycarbonates such as bisphenol A polycarbonate, in the presence of at least one dihydroxy aromatic compound. A block copolyestercarbonate having polyester blocks and polycarbonate blocks is produced.

Current methods of preparing block copolyestercarbonates suffer from the disadvantages inherent in the use of highly toxic chemicals such as phosgene. Moreover, the use of one or more solvents during the preparation of the hydroxy-terminated oligomeric polyester and during the reaction of the hydroxy-terminated oligomeric polyester with phosgene and at least one dihydroxy aromatic compound requires that steps must be taken to prevent the escape of process solvents from the equipment used. Control measures taken to prevent the escape of process solvents add to the cost and complexity of the manufacturing process. It would be desirable to provide a method for making copolyestercarbonates which did not rely on phosgene and minimized the use of organic solvents.

An alternative methodology, analogous to the melt preparation of polycarbonates, is inapplicable to the manufacture of block copolyestercarbonates due to the tendency of the structural units to randomize under the reaction conditions. Thus, treatment of a mixture of one or more dihydroxy aromatic compounds with a source of ester units such as diphenyl terephthalate, and a source of carbonate units such as diphenyl carbonate in the melt at high temperature in the presence of a catalyst such as sodium hydroxide affords a random copolyestercarbonate owing to the tendency of the structural units of the copolyestercarbonate to achieve a statistical distribution throughout the polymer chains under melt polymerization conditions.

Attempts to incorporate hydroxy-terminated oligomeric polyester intact into polycarbonate chains by reaction of said hydroxy-terminated oligomeric polyester with a source of carbonate units such as diphenyl carbonate and a dihydroxy aromatic compound under the conditions used to prepare melt polycarbonate likewise affords a random copolyestercarbonate owing to the tendency of the polyester blocks to randomize as the polymerization proceeds. In addition to affording random copolyestercarbonates, the "melt" method, although obviating the need for phosgene or an organic solvent such as methylene chloride, requires high temperatures and relatively long reaction times. As a result, by-products may be formed at high temperature, such as the products arising by Fries rearrangement of carbonate and ester units along the growing polymer chains. Fries rearrangement gives rise to uncontrolled polymer branching which may negatively impact the flow properties and performance of the polymer. Moreover, Fries rearrangement may result in "yellowing" of the product copolyestercarbonate. It would be desirable therefore to provide a method for making block copolymers incorporating polycarbonate and polyester structural units which did not require the use of high temperatures and which minimized the formation of Fries product.

Polycarbonates and copolyestercarbonates have been prepared by solid state polymerization (SSP). SSP offers several advantages over both melt phase and the interfacial polycondensation processes. SSP does not require the use of phosgene gas which forms an important element of the interfacial process. Additionally SSP utilizes considerably lower temperatures than those required for the preparation of high molecular weight polycarbonate by melt polymerization of a diaryl carbonate such as diphenyl carbonate and a bisphenol such as bisphenol A. Also, the SSP process, unlike the melt phase process, does not require handling highly viscous polymer melt at high temperatures and the special equipment capable of mixing polymer melt under vacuum at high temperature required in the melt process is not required to perform the SSP process.

In a solid state polymerization process, a precursor polycarbonate, typically a relatively low molecular weight oligomeric polycarbonate, is prepared by the melt reaction of a diaryl carbonate such as diphenyl carbonate with a bisphenol such as bisphenol A. In the preparation of bisphenol A polycarbonate oligomers, a diaryl carbonate such as diphenyl carbonate is heated together with bisphenol A in the presence of a catalyst such as sodium hydroxide while removing phenol. Phenol is formed as a by-product of the transesterification reaction between phenolic groups of the growing polymer chains and diphenyl carbonate or phenyl carbonate polymer chain endgroups. This oligomerization reaction is typically carried out under reduced pressure to facilitate the orderly removal of the phenol by-product. When the desired level of oligomerization has been achieved the reaction is terminated and the product oligomeric polycarbonate is isolated. The oligomeric polycarbonate so produced is amorphous and must be partially crystallized in order to be suitable for solid state polymerization.

The oligomeric polycarbonate may be partially crystallized by one of several methods, such as exposure of powdered or pelletized oligomer to hot solvent vapors, or dissolution of the amorphous oligomer in a solvent such as methylene chloride and thereafter adding a solvent such as methanol or ethyl acetate to precipitate crystalline oligomeric polycarbonate. Typically, such solvent vapor or liquid solvent crystallization methods result in partially crystalline oligomeric polycarbonates having a percent crystallinity between about 20 and about 40 percent as measured by differential scanning calorimetry. A percent crystallinity in this range is usually sufficient for the oligomeric polycarbonate to undergo solid state polymerization without fusion of the pellets or powder being subjected to SSP. In addition to solvent induced crystallization, oligomeric bisphenol A polycarbonate has been crystallized by dissolving diphenyl carbonate in molten amorphous polycarbonate oligomer followed by cooling the mixture to ambient temperature to afford partially crystalline polycarbonate as a mixture with diphenyl carbonate. Finally, amorphous oligomeric polycarbonates have been crystallized by prolonged heating at a temperature below the melting point of the partially crystalline polycarbonate. However, such thermally induced crystallization is quite slow relative to the aforementioned crystallization methods.

The partially crystalline oligomeric polycarbonate in a solid form such as a powder, particulate or pellet is then heated under solid state polymerization conditions at a temperature below the sticking temperature or melting point of the oligomeric polycarbonate, but above the glass transition temperature of the partially crystalline oligomeric polycarbonate, and the volatile by-products formed as chain growth occurs, phenol, diphenyl carbonate and the like, are removed. The polycondensation reaction which converts the low molecular weight oligomer to high polymer is effected in the solid state under these conditions.

Although modern solid state polymerization methods provide a valuable alternative to the melt and interfacial copolyestercarbonate syntheses, the solid state polymerization method suffers from several disadvantages. Typically, the partially crystalline precursor polycarbonate and a partially crystalline oligomeric polyester precursor require two steps for their preparation; an oligomerization step and a crystallization step. Moreover, the solid state polymerization process itself is relatively slow, and affords a random distribution of ester and carbonate structural units within the product copolyestercarbonate. Thus it would be highly desirable to discover improvements which provide greater efficiency in the preparation of the partially crystalline precursor polycarbonate, employ either an amorphous or crystalline oligomeric polyester precursor, and enhance the rates of solid state polymerization such that polymer chain growth proceeds faster than the processes responsible for randomization of ester and carbonate structural units. Such randomization processes typically are manifested by a dramatic reduction in polyester and polycarbonate block lengths.

BRIEF SUMMARY OF THE INVENTION

In one aspect, the present invention provides a method of preparing block copolymers, said method comprising contacting a partially crystalline polycarbonate starting material (A) comprising activated terminal aryloxy groups with at least one polymeric species (B) comprising reactive terminal hydroxy groups under solid state polymerization conditions to afford a product block copolymer. In one aspect of the present invention the block copolymer is a multiblock copolyestercarbonate.

DETAILED DESCRIPTION OF THE INVENTION

The present invention may be understood more readily by reference to the following detailed description of preferred embodiments of the invention and the examples included herein. In this specification and in the claims which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyester carbonates.

As used herein, the term "melt polycarbonate" refers to a polycarbonate made by the transesterification of at least one diaryl carbonate with at least one dihydroxy aromatic compound.

"BPA" is herein defined as bisphenol A and is also known as 2,2-bis(4-hydroxyphenyl)propane, 4,4'-isopropylidenediphenol and p,p-BPA.

As used herein, the term "bisphenol A polycarbonate" refers to a polycarbonate in which essentially all of the repeat units comprise a bisphenol A residue.

As used herein, the term "partially crystalline polycarbonate starting material (A) comprising activated terminal aryloxy groups" is used interchangeably with the terms "partially crystalline polycarbonate starting material (A)" and "starting material (A)", each of said terms referring to a partially crystalline polycarbonate comprising activated terminal aryloxy groups.

As used herein the term "polymeric species (B) comprising reactive terminal hydroxy groups" is used interchangeably with the terms "polymeric species (B)" and "starting material (B)", each of said terms referring to a polymeric species comprising reactive terminal hydroxyl groups.

As used herein, the term "partially crystalline polycarbonate starting material" refers to a partially crystalline polycarbonate of any molecular weight which is used as a reactant in a solid state polymerization reaction.

As used herein, the term "polymeric species" includes both polymeric and oligomeric materials. Polymeric materials are defined as having weight average molecular weights, $M_w$, greater than 15,000 daltons, and oligomeric materials are defined as having weight average molecular weights, $M_w$, less than 15,000 daltons.

The term "partially crystalline precursor polycarbonate" refers to an oligomeric polycarbonate having a weight average molecular weight of less than 15000 daltons and percent crystallinity of at least about 15 percent based on differential scanning calorimetry.

The terms "partially crystalline precursor polycarbonate" and "partially crystalline oligomeric polycarbonate" are used interchangeably.

As used herein, the term "polyester" includes both aliphatic and aromatic polyesters. Thus, the term "polyester" as used herein includes aromatic polyesters sometimes referred to as "polyarylates".

As used herein, the term "oligomeric hydroxy-terminated polyester" includes both aliphatic and aromatic oligomeric hydroxy-terminated polyesters. Thus, the term "oligomeric hydroxy-terminated polyesters" includes oligomeric hydroxy-terminated polyarylates.

As used herein, the term "oligomeric hydroxy-terminated polyester" refers to an oligomeric polyester having a weight average molecular weight ($M_w$) of less than 15,000 and having hydroxy groups at about 50 percent or more of its chain ends. For example, a polyester prepared by the melt reaction of excess resorcinol with a 1:1 mixture of diphenyl isophthalate and diphenyl terephthalate, having a weight average molecular weight of 9,000 daltons and possessing hydroxy groups at 80 percent of the chain ends and phenoxy groups at 20 percent of the chain ends, represents an oligomeric hydroxy-terminated polyester.

As used herein, the term "reactive terminal hydroxyl groups" refers to hydroxy groups located at the chain ends of polymeric species, for example, the hydroxy groups found at the chain ends of an oligomer produced by the interfacial reaction of a 10 mole percent excess of bisphenol A with isophthaloyl dichloride.

As used herein the terms bis(methyl salicyl)carbonate and bis(2-methoxycarbonylphenyl)carbonate have the same meaning and are used interchangeably.

As used herein the term "percent endcap" refers to the percentage of polycarbonate chain ends which are not hydroxyl groups. In the case of bisphenol A polycarbonate prepared from diphenyl carbonate and bisphenol A, a "percent endcap" value of about 75% means that about seventy-five percent of all of the polycarbonate chain ends comprise phenoxy groups while about 25% of said chain ends comprise hydroxyl groups. The terms "percent endcap" and "percent endcapping" are used interchangeably.

As used herein the term "aromatic radical" refers to a radical having a valence of at least one and comprising at least one aromatic ring. Examples of aromatic radicals include phenyl, pyridyl, furanyl, thienyl, naphthyl, phenylene, and biphenyl. The term includes groups containing both aromatic and aliphatic components, for example a benzyl group.

As used herein the term "aliphatic radical" refers to a radical having a valence of at least one and consisting of a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "cycloaliphatic radical" refers to a radical having a valance of at least one and comprising an array of atoms which is cyclic but which is not aromatic, and which does not further comprise an aromatic ring. The array may include heteroatoms such as nitrogen, sulfur and oxygen or may be composed exclusively of carbon and hydrogen. Examples of cycloaliphatic radicals include cyclopropyl, cyclopentyl cyclohexyl, 2-cyclohexylethy-1-yl, tetrahydrofuranyl and the like.

As used herein, the term "multilayer article" refers to an article which comprises at least two layers.

The present invention relates to a method for preparing block copolymers, said method comprising contacting a partially crystalline polycarbonate starting material (A) comprising activated terminal aryloxy groups with at least one polymeric species (B) comprising reactive terminal hydroxy groups under solid state polymerization conditions to afford a product block copolymer. In one aspect of the present invention the block copolymer is a multiblock copolyestercarbonate.

The partially crystalline polycarbonate starting material (A) according to the method of the present invention comprises activated terminal aryloxy groups having structure I

wherein $R^1$ is independently at each occurrence a $C_1$–$C_{20}$ aliphatic radical, $C_4$–$C_{20}$ cycloaliphatic radical, $C_4$–$C_{20}$ aromatic radical; $R^2$ is independently at each occurrence a halogen atom, nitro group, cyano group, $C_1$–$C_{20}$ alkoxycarbonyl group, $C_1$–$C_{20}$ acyl group, $C_4$–$C_{20}$ cycloalkoxycarbonyl group, $C_6$–$C_{20}$ aryoxycarbonyl group, $C_1$–$C_{20}$ alkylaminocarbonyl group, $C_2$–$C_{40}$ dialkylaminocarbonyl group, or a $C_1$–$C_{20}$ perfluoroalkyl group; p is an integer having a value 0 to 4, and q is an integer having a value of 1 to 5.

Terminal groups having structure I are exemplified by the 2-methoxycarbonylphenoxy, 2-cyanophenoxy, 2-acetylphenoxy, 2-nitrophenoxy, 4-nitrpophenoxy, and 2,4,6-trifluorophenoxy groups.

In one embodiment of the present invention the partially crystalline polycarbonate starting material (A) comprising activated terminal aryloxy groups is prepared by the melt reaction of at least one dihydroxy aromatic compound with at least one diaryl carbonate to provide an amorphous polycarbonate which is then crystallized in a second step. In some instances the partially crystalline polycarbonate starting material (A) comprising activated terminal aryloxy groups may be obtained directly by reaction of a dihydroxy aromatic compound with a diaryl carbonate, for example the reaction of bisphenol A with bis(methyl salicyl)carbonate under reaction conditions promoting the crystallization of the polycarbonate product. Alternatively, the partially crystalline polycarbonate starting material (A) comprising activated terminal aryloxy groups may be obtained by interfacial reaction of phosgene with at least one dihydroxy aromatic compound in the presence of an acid acceptor and a hydroxy aromatic compound chainstopper, said chain stopper comprising at least one "activating substituent". Activating substituents include alkoxycarbonyl groups; for example, the methoxycarbonyl group, the cyano group; the nitro group; and halogen atoms. Chainstoppers incorporating at least one activating substituent are exemplified by methyl salicylate, 2-cyanophenol, 2,4,6-trifluorophenol and the like.

In yet a further embodiment of the present invention, the partially crystalline polycarbonate starting material (A) comprising activated terminal aryloxy groups is prepared by a method comprising treatment under melt reaction conditions of a polycarbonate comprising reactive terminal hydroxy groups, with a diaryl carbonate comprising activating substituents, for example, diaryl carbonates having structure II. Thus, a polycarbonate comprising reactive terminal hydroxy groups, said polycarbonate having been prepared either by melt polymerization or interfacial polymerization, may be further reacted with a diaryl carbonate comprising activating substituents, thereby converting all or a portion of said reactive terminal hydroxy groups to endgroups comprising activated terminal aryloxy groups and affording a polycarbonate comprising said activated terminal aryloxy groups. Crystallization of said polycarbonate comprising activated terminal aryloxy groups affords starting material (A).

The term "melt polymerization conditions" is understood to mean those conditions necessary to effect reaction between a diaryl carbonate and a dihydroxy aromatic compound in the presence of a catalyst and optionally a co-catalyst. The catalyst may be any one of a number of transesterification catalysts, such as alkali metal hydroxides, alkaline earth hydroxides and mixtures thereof. Co-catalysts include tetraalkylammonium hydroxides, such as tetramethylammonium hydroxide; tetraalkylphosphonium hydroxides, such as tetrabutylphosphonium hydroxide; and tetraalkylphosphonium carboxylates, such as tetrabutylphosphonium acetate. The reaction temperature is typically in the range of about 100 to about 350° C., more preferably about 180 to about 310° C. The pressure may be at atmospheric pressure, supraatmospheric pressure, or a range of pressures from atmospheric pressure to about 15 torr in the initial stages of the reaction, and at a reduced pressure at later stages, for example in the range of about 0.2 to about 15 torr. The reaction time is generally about 0.1 hours to about 10 hours.

In one embodiment of the present invention the partially crystalline polycarbonate starting material (A) is prepared by a method comprising reacting under melt polymerization conditions at least one dihydroxy aromatic compound with at least one diaryl carbonate II

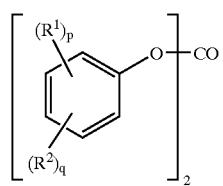

wherein $R^1$, $R^2$, p and q are defined as in structure I.

Diaryl carbonates II are exemplified by bis(2-methoxycarbonylphenyl) carbonate, bis(4-chloro-2-methoxycarbonylphenyl) carbonate, bis(2-ethoxycarbonylphenyl) carbonate, bis(2-butoxycarbonylphenyl) carbonate, bis(2,4,6-trifluorophenyl) carbonate, bis(2-nitrophenyl) carbonate, and bis(2-cyanophenyl) carbonate.

Dihydroxy aromatic compounds which may be employed to prepare said partially crystalline polycarbonate starting material (A) include bisphenols III

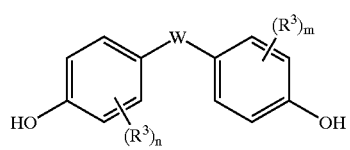

wherein $R^3$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

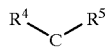

wherein $R^4$ and $R^5$ are independently a hydrogen atom, $C_1$–$C_{20}$ alkyl group, $C_4$–$C_{20}$ cycloalkyl group, or $C_4$–$C_{20}$ aryl group; or $R^4$ and $R^5$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

Bisphenols having structure III are exemplified by bisphenol A; 2,2-bis(4-hydroxy-3-methylphenyl)propane; 2,2-bis(4-hydroxy-2-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; 1,1-bis(4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene and 1,4-bis(2-(4-hydroxy-3-methylphenyl)-2-propyl)benzene.

In one embodiment of the present invention the partially crystalline polycarbonate starting material (A) comprises repeat units derived from bisphenol A, and 2-methoxycarbonylphenoxy groups, IV, said group IV comprising the activated terminal aryloxy groups.

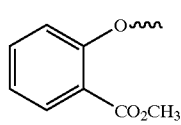

Typically, the partially crystalline polycarbonate starting material (A) will have a percent endcap of between about 50 and about 100 percent and a percent crystallinity as measured by differential scanning calorimetry of between about 15 and about 40 percent. Typically, starting material (A) will have a weight average molecular weight between about 1000 and about 30,000 daltons.

In one embodiment of the present invention the partially crystalline polycarbonate starting material (A) is a "partially crystalline precursor polycarbonate" as defined herein, said partially crystalline precursor polycarbonate having a weight average molecular weight less than 15000 daltons, preferably in a range between about 1000 and about 14000 daltons.

The polymeric species (B) comprising reactive terminal hydroxy groups may be at least one polyester, polycarbonate, polyether, polyetherketone, polyethersulfone, polyetherimides, and a mixture thereof.

In one embodiment of the present invention the polymeric species (B) comprising reactive terminal hydroxy groups comprises structural units selected from the group consisting of (1) polyester structural units corresponding to structure V

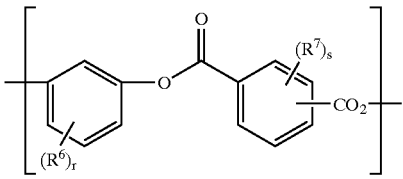

wherein $R^6$ and $R^7$ are independently at each occurrence a halogen atom, $C_1$–$C_{20}$ aliphatic radical, $C_4$–$C_{20}$ cycloaliphatic radical, or a $C_4$–$C_{20}$ aromatic radical, and r and s are independently integers having values from 0 to 4; and (2) polycarbonate structural units corresponding to structure VI

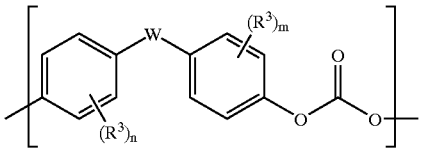

wherein $R^3$, n, m, and W are defined as in structure III.

In a further embodiment of the present invention the polymeric species (B) comprising reactive terminal hydroxy groups is an oligomeric polyester comprising structural units VII and having a degree of polymerization of at least about 4.

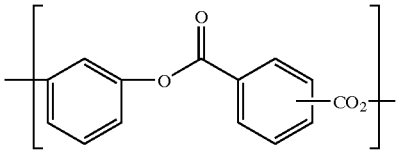

Polyesters comprising repeat units having structure V may be prepared by a variety of known methods including the interfacial reaction of one or more diacid chlorides, such as terephthaloyl dichloride and isophthaloyl dichloride, with one or more dihydroxy aromatic compounds, such as resorcinol, in the presence of an acid acceptor and an amine catalyst such as a triethylamine.

In one embodiment, resorcinol is reacted with a mixture of terephthaloyl dichloride and isophthaloyl dichloride under interfacial conditions such that the molar ratio of resorcinol to total moles of terephthaloyl dichloride and isophthaloyl dichloride is between about 1.01 and about 1.5, and the molar ratio of terephthaloyl dichloride to isophthaloyl dichloride is in a range between about 1 to about 10 and about 10 to about 1.

Polyesters comprising repeat units having structure V may also be prepared by contacting one or more dihydroxy aromatic compounds, such as resorcinol and hydroquinone, with one or more diaryl esters such as diphenyl terephthalate and diphenyl isophthalate, under melt polymerization conditions in the presence of a transesterification catalyst such as an alkali metal hydroxide and a co-catalysts, such as a tetraalkylammonium hydroxide. The use of excess dihydroxy aromatic compound favors the formation of hydroxy terminated polymeric species.

In one embodiment of the present invention polymeric species (B) is a polyester comprising repeat units VII and further comprising reactive terminal hydroxy groups is prepared by reacting resorcinol under melt polymerization conditions with a mixture of diphenyl terephthalate and diphenyl isophthalate in the presence of a transesterification catalyst. The reaction is carried out such that the molar ratio of moles of resorcinol to the combined number of moles of diphenyl terephthalate and diphenyl isophthalate is between about 1.01 and about 1.5, and the molar ratio of diphenyl terephthalate to diphenyl isophthalate is in a range between about 1 to about 10 and about 10 to about 1.

In an alternate embodiment of the present invention polymeric species (B) comprising repeat units VII and further comprising reactive terminal hydroxy groups is prepared by reacting resorcinol reacted under melt polymerization conditions with a mixture of diphenyl terephthalate and diphenyl isophthalate in the absence of any added catalyst. The reaction is carried out such that the molar ratio of moles of resorcinol to the combined number of moles of diphenyl terephthalate and diphenyl isophthalate is between about 1.01 and about 1.5, and the molar ratio of diphenyl terephthalate to diphenyl isophthalate is in a range between about 1 to about 10 and about 10 to about 1.

Block copolymers are prepared according to the method of the present invention by contacting a partially crystalline polycarbonate starting material (A) comprising activated terminal aryloxy groups with at least one polymeric species (B) comprising reactive terminal hydroxy groups under solid state polymerization conditions. The starting material (A) may be a partially crystalline "polymeric material" as defined herein, meaning a polycarbonate having a weight average molecular weight, $M_w$, of greater than 15,000 daltons. Alternatively, partially crystalline polycarbonate starting material (A) may be a partially crystalline oligomeric polycarbonate having $M_w$, of less than 15,000 daltons.

Contacting the partially crystalline polycarbonate starting material (A) comprising activated terminal aryloxy groups with at least one polymeric species (B) comprising reactive terminal hydroxy groups under solid state polymerization conditions may be carried out by forming a mixture of starting materials (A) and (B) and subjecting the said mixture to solid state polymerization conditions. The mixture may be formed by mixing the partially crystalline polycarbonate starting material (A) in powder form with polymeric species (B) in powder form. This mixing may be accomplished by dry mixing the two powders using a variety of mechanical devices, for example, a roller mixer, or a Henschel mixer.

Typically, crystalline polycarbonate starting material (A) is mixed together with at least one polymeric species (B) such that the weight ratio of starting material (A) to starting material (B) is in a range between about 0.01 to about 100 and about 100 to about 0.01. For example, the starting materials (A) and (B) are mixed in a weight ratio of between 0.01 grams and 100 grams starting material (A) per gram of starting material (B). More typically, the weight ratio of starting material (A) to starting material (B) is in a range between about 1 to about 5 and about 5 to about 1. In instances wherein starting material (A) is partially crystalline and starting material (B) is amorphous it is desirable that starting material (A) be the major component present in the mixture.

In some instances the polymeric species (B) may be a partially crystalline material or may be amorphous. For example, where the polymeric species (B) is a hydroxy terminated polyester such as polyethylene terephthalate or polybutylene terephthalate it may be a partially crystalline material. Alternatively, where polymeric species (B) is a hydroxy terminated polyarylate comprising structural units derived from resorcinol, diphenyl terephthalate and diphenyl isophthalate it will typically be an amorphous material.

Alternate methods of preparing mixtures of the starting materials (A) and (B) include preparing a solution containing a polycarbonate starting material comprising activated terminal aryloxy groups, and a polymeric species (B), and adding an anti solvent to precipitate the two materials as a mixture. Suitable solvents include halogenated solvents such as methylene chloride. Anti solvents include alcohols such as methanol, ketones such as acetone, and esters such as ethyl acetate. The precipitate contains the polymeric species (B) admixed with the partially crystalline polycarbonate starting material (A).

In one embodiment of the present invention the partially crystalline precursor polycarbonate (A) in powder form is mixed with at least two polymeric species (B), for example powdered forms of polyethylene terephthalate and a polyarylate oligomer comprising structural units VII, and the mixture of powders is then reacted under solid state polymerization conditions to afford a block copolyestercarbonate.

The solid state polymerization conditions employed according to the method of the present invention comprise heating a mixture of the partially crystalline polycarbonate starting material (A) with at least one polymeric species (B) at a temperature between about 100° C. and about 240° C. for a period of from about 0.5 and about 10 hours, preferably between about 140° C. and about 220° C. for a period of from between about about 2 and about 9 hours. The solid state polymerization may be carried out in any reaction vessel adapted for contacting a stream of an inert gas with the solid undergoing solid state polymerization, and removal of the by-products of solid state polymerization. The by-products of solid state polymerization are principally hydroxy aromatic compounds comprising at least one activating substituent, for example methyl salicylate. The hydroxy aromatic compound by-products are formed in chain growth steps such as when the reactive hydroxy groups of starting material (B) react with the activated terminal groups of starting material (A). The by-products of solid state polymerization may also include diaryl carbonates such as II and mixed carbonates, for example phenyl salicyl carbonate. Mixed carbonates and phenol may be present in the by-products of solid state polymerization when starting material (A) comprises activated terminal aryloxy groups and starting material (B) comprises terminal phenoxy groups, as is the case when stating material (B) is made by the melt reaction of one or more diphenyl esters with a molar excess of a dihydroxy aromatic compound.

The solid state polymerization process may be carried out in either a batch or continuous mode. In one embodiment of the present invention the solid mixture undergoing solid state polymerization is configured as a fixed bed with an inert gas passing through it.

The block copolymer product made by the method of the present invention is typically a multi-block copolymer. In some instances both starting material (A) and starting material (B) contain internal functional groups subject to attack by a reactive hydroxy group, for example the internal carbonate groups of starting material (A) or the internal ester linkages present when starting material (B) is an oligomeric polyester. Reactions between terminal reactive hydroxy groups and internal functional groups results in a reduction of the average block length of one or more of the blocks present in the product block copolymer. Under certain conditions a completely random distribution of the repeat units present in the product block copolymer may be obtained. An important feature of the method of the present invention is the ability to control and limit the randomization of the structural units present in the block copolymer. This is achieved by favoring bond forming processes between starting material (A) and starting material (B) based upon the enhance reactivity of the terminal groups in starting material (A). Thus the method of the present invention preserves to a greater extent the block lengths of the starting materials than do other solid state polymerization methods in which the partially crystalline polycarbonate lacks activated terminal aryloxy groups I. This preservation of the block lengths is quantifiable by comparing the block lengths present in the product block copolymer with the block lengths which would be expected if the structural units of the copolymer were distributed randomly along the polymer chain. In one embodiment of the present invention the block lengths of the product block copolymer are at least 50 to about 90 percent longer, preferably at least 60 to about 90 percent longer than the corresponding random distribution of structural units in an identically constituted copolymer.

The block copolymers made by the method of the present invention may optionally be blended with any conventional additives, including but not limited to dyestuffs, UV stabilizers, antioxidants, heat stabilizers, and mold release agents, to form a molded article. In particular, it is preferable to form a blend of the block copolymer and additives which aid in processing the blend to form the desired molded article. The blend may optionally comprise from about 0.0001 to about 10% by weight of the desired additives, more preferably from about 0.0001 to about 1.0% by weight of the desired additives.

Substances or additives which may be added to the block copolymers of this invention, include, but are not limited to, heat-resistant stabilizer, UV absorber, mold-release agent, antistatic agent, slip agent, antiblocking agent, lubricant, anticlouding agent, coloring agent, natural oil, synthetic oil, wax, organic filler, inorganic filler and mixtures thereof.

Examples of the aforementioned heat-resistant stabilizers, include, but are not limited to, phenol stabilizers, organic thioether stabilizers, organic phosphide stabilizers, hindered amine stabilizers, epoxy stabilizers and mixtures thereof. The heat-resistant stabilizer may be added in the form of a solid or liquid.

Examples of UV absorbers include, but are not limited to, salicylic acid UV absorbers, benzophenone UV absorbers, benzotriazole UV absorbers, cyanoacrylate UV absorbers and mixtures thereof.

Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, and other fatty acid ester mold release agents; silicone oil and other silicone mold release agents, and mixtures of any of the aforementioned.

The coloring agent may be either pigments or dyes. Inorganic coloring agents and organic coloring agents may be used separately or in combination in the invention.

The block copolymers prepared by the method of the present invention may transformed into desired articles by molding the block copolymer, or a blend of the block copolymer with a second polymer such as bisphenol A polycarbonate, by injection molding, compression molding, extrusion methods and solution casting methods. Injection molding is the more preferred method of forming the article. In one embodiment, the molded article formed from the block copolymer made by the method of the present invention is a multilayer article. Multilayer articles prepared from block copolymers comprising structural units V and VI, said block copolymers being prepared by the method of the present invention, are particularly well suited for use in such varied outdoor applications such as body parts for outdoor vehicles and the like.

EXAMPLES

The following examples are set forth to provide those of ordinary skill in the art with a detailed description of how the methods claimed herein are made and evaluated, and are not intended to limit the scope of what the inventors regard as their invention. Unless indicated otherwise, parts are by weight, temperature is in ° C.

Molecular weights are reported as number average ($M_n$) or weight average ($M_w$) molecular weight and were determined by gel permeation chromatography (GPC). Two GPC calibration methods were employed. The first method employed polycarbonate molecular weight standards to construct a broad standard calibration curve against which polymer molecular weights were determined. This calibration method was used to determine the molecular weights of methyl salicylate endcapped polycarbonate oligomers used to prepare block copolycarbonates as described herein. The second GPC calibration method relied upon a series of polystyrene standards of known molecular weight which were used to construct a calibration curve with which to determine the molecular weights of product copolyestercarbonates. This second GPC calibration method was also used to determine the molecular weights of oligomeric polyesters described herein. When characterizing a polycarbonate by GPC, it is generally believed that the molecular weights obtained using polycarbonate standards are more accurate than those obtained using polystyrene standards. In general, polycarbonate molecular weights determined using a polystyrene standard based GPC method have $M_n$ and $M_w$ values which are about 1.5 to about 2.5 times higher than the same values measured using polycarbonate standards. Throughout this application, the degree of polymerization (DP) of polycarbonate and polyester oligomers was obtained using NMR. Polycarbonate oligomer degree of polymerization values obtained by NMR generally correlate well with $M_n$ values obtained by GPC using polycarbonate molecular weight standards. Gel permeation chromatography was carried out such that the temperature of the columns was about 25° C. and the mobile phase was chloroform.

Solid state polymerizations were carried out as follows. About 1 gram of the material being subjected to a "heating protocol under solid state polymerization conditions" was placed in a 10 mL fritted funnel positioned in a convection oven. The base of the oven was equipped with a nitrogen inlet. Nitrogen, preheated by passage through approximately 16 meters of copper tubing contained within the convection oven, was passed through the base of the funnel, through the material undergoing solid state polymerization and out through the top of the funnel. The nitrogen flow rate was about 2.5 liters per minute. Typically, over the course of the solid state polymerization reaction the temperature was raised in one or more steps from an initial temperature of about 140° C. to a final temperature in a range between about 165° C. and about 220° C. The course of the solid state polymerization reaction was followed by periodically sampling the material in the fritted funnel and subjecting the sample to differential scanning calorimetry (DSC). The copolyestercarbonate product of solid state polymerization the product was characterized by DSC to determine the glass transition temperature, GPC using polystyrene standards to determine the values of $M_n$ and $M_w$, and NMR to evaluate the composition and blockiness of the product copolyestercarbonate. The product copolyestercarbonates are "multi-block copolyestercarbonates" which for convenience are referred to here simply as "block copolyestercarbonates".

Preparation of Methyl Salicylate Endcapped Polycarbonate Oligomers

Melt reactions of bis(methyl salicyl)carbonate with bisphenol A reactions were carried out in a 500-mL or 1000-L glass batch reactor equipped with a helical agitator, distillation head and a graduated receiving vessel. To remove any adventitious sodium from the glass walls of the reactor, the reactor was soaked in 3N HCl for at least 12 hours followed by rinsing and immersion in deionized water (18 Mohm) for at least 12 hours. The reactor was then dried in an oven overnight prior to use. The reactor was heated by means of a fluidized sand bath with a PID controller. The bath temperature was measured near the interface of the reactor and the sand bath. The pressure over the reactor was controlled by a nitrogen bleed downstream of the receiving flask. Pressure was measured with a MKS pirani gauge.

Example 1

Amorphous methyl salicyl endcapped polycarbonate was prepared as follows. The reactor was charged with 150 grams (0.6571 mole) solid bisphenol-A (BPA) and 243.6 grams (0.7368 mole) solid bis(methyl salicyl)carbonate (BMSC) such that the molar ratio of BMSC to BPA was about 1.12 at the outset of the reaction. Tetrabutyl phosphonium acetate co-catalyst was added in an amount corresponding to $2.5 \times 10^{-4}$ moles co-catalyst per mole BPA. The catalyst, EDTA magnesium disodium salt, was added in an amount corresponding to $1.0 \times 10^{-6}$ mole catalyst per mole BPA. The reactor was sealed and the atmosphere was exchanged with nitrogen three times. Following the final nitrogen exchange the pressure in the reactor was brought to between about 5 and about 15 mmHg. In a first stage, the reactor was submerged in the fluidized bath at 170° C. After five minutes, agitation was begun at a rate of 60 rpm. After an additional ten to fifteen minutes the reactants were fully melted and the agitator speed was increased to 200 rpm. The reaction mixture was stirred and heated while liberated methyl salicylate was collected in the receiving vessel. Between about 90 and about 95 percent of the theoretical amount (based on complete reaction between BPA and the BMSC) of the methyl salicylate by-product was removed at 170° C. The bath temperature was then raised through a series of temperature stages; 210° C., 240° C., and 270° C. and the reaction mixture was stirred for 20 minutes at each stage. During the last two stages (240° C. and 270° C.) the pressure over the reaction mixture was reduced to about 1 torr or less. The reaction vessel was then removed from the sand bath and the vessel was gently purged with nitrogen gas. The amorphous, oligomeric product was recovered and was determined to have $M_w$=4820 and $M_n$=2138, as measured by GPC using a polycarbonate molecular weight standards. The percent endcap was 99%.

Examples 2–6 represent analogously prepared amorphous methyl salicyl endcapped polycarbonate oligomers. Data for oligomeric polycarbonates of Examples 2–6 are gathered in Table 1.

TABLE 1

AMORPHOUS METHYL SALICYL ENCAPPED OLIGOMERS

| Example | BMSC/BPA | Mw | Mn | [OH] | EC(%) |
|---|---|---|---|---|---|
| 2 | 1.042 | 12906 | 5697 | 109 | 98.2 |
| 3 | 1.052 | 10853 | 4973 | 96 | 98.6 |
| 4 | 1.064 | 9547 | 3871 | 189 | 97.9 |
| 5 | 1.087 | 6885 | 3134 | 0 | 100 |
| 6 | 1.136 | 4376 | 2013 | 0 | 100 |

Examples 7–10

Crystalline oligomeric polycarbonates incorporating methyl salicyl endgroups were prepared analogously. The reactor was charged with solid BPA (150 g or 300 g, 0.6571 or 1.3141 mole) and solid BMSC such that the molar ratio of BMSC to BPA was between about 1.00 and about 1.15 at the outset of the reaction. Catalyst identifies and amounts were the same as those used in Example 1. The reactor was, sealed and the atmosphere was exchanged with nitrogen three times. Following the final nitrogen exchange the pressure in the reactor was brought to between about 5 and about 15 mmHg. In a first stage, the reactor was submerged into the fluidized bath at 170° C. After five minutes, agitation was begun at a rate of 60 rpm. After an additional ten to fifteen minutes the reactants were fully melted and the agitator speed was increased to 200 rpm. The reaction mixture was stirred and heated while liberated methyl salicylate was collected in the receiving vessel. To obtain lower molecular weight crystalline oligomers, methyl salicylate was distilled from the reaction vessel until between about 90 and about 95 percent of the theoretical amount (based on complete reaction between BPA and the BMSC) of the methyl salicylate by product had been removed. The reaction vessel was then removed from the sand bath and the vessel was gently purged with nitrogen gas. Upon cooling, the crystalline oligomeric product was observed to contract and fracture. The cooled crystalline product was easily poured from the reactor. Data for crystalline methyl salicyl endcapped polycarbonate oligomers prepared by this method are gathered in Table 2.

TABLE 2

CRYSTALLINE METHYL SALICYL ENCAPPED OLIGOMERS

| Example | BMSC/BPA | Mw | Mn | [OH] | EC(%) | % Cryst |
|---|---|---|---|---|---|---|
| 7 | 1.05 | 9400 | 4017 | 778 | 90.8 | 22 |
| 8 | 1.03 | 12864 | 6026 | 1017 | 82.0 | 31 |
| 9 | 1.02 | 15486 | 6553 | 1025 | 80.2 | 30 |
| 10 | 1.017 | 16035 | 7021 | 959 | 80.2 | 30 |

In Tables 1 and 2 the ratio "BMSC/BPA" represents the mole ratio of bis(methyl salicyl)carbonate to bisphenol A employed. The symbol "[OH]" is expressed in parts per million (ppm) and represents the concentration of free hydroxyl groups found in the product polycarbonate. The free hydroxyl group concentration was determined by quantitative infrared spectroscopy. "EC (%)" represents the percentage of polymer chain ends not terminating in a hydroxyl group. Salicyl endgroups were determined by HPLC analysis after product solvolysis. The term "% Cryst" represents the percent crystallinity of the product polycarbonate and was determined by differential scanning calorimetry.

Preparation of Hydroxy Terminated Polyester Oligomers

Example 11

Into a glass reactor equipped with a mechanical stirrer, Dean Stark trap with Vigreux column and vacuum attachment was charged resorcinol (3.03 g, 0.0275 moles), diphenylisophthalate (3.98 g, 0.0125 moles), diphenylterephthalate (3.98 g, 0.0125 moles), lithium hydroxide (2.2 milligrams [mg]), and tetramethylammonium hydroxide (10 microliters of 25 wt % solution). A nitrogen atmosphere was established (3 vacuum purges) and slow stirring begun. The reactor was lowered into a salt bath controlled at about 200° C. After 15 minutes the pressure was reduced to 100 Torr. This pressure and temperature were maintained for 45 minutes during which time about 1 mL of phenol was collected. The pressure was then lowered to 50 Torr and maintained for 60 minutes, collecting an additional 1 mL of phenol. The temperature was then raised to 220° C. and after 60 minutes an additional 1.2 mL of phenol was obtained. For the next 30 minutes the reactor was held at 220° C. and 25 Torr. Finally, the temperature increased to 240° C. and full vacuum applied for 45 minutes, the final amount of phenol being about 3.5 mL (80% of theory). The viscous amber colored material was poured onto an aluminum pan, yielding 4.5 grams product oligomeric hydroxy-terminated polyester. GPC analysis indicated a Mw of 8,026. The Tg of this material was 112° C. Oligomeric hydroxy-terminated polyesters comprising structural units derived from resorcinol, isophthalic acid, and terephthalic acid, or their derivatives, are referred to as "ITR oligomers".

A series of oligomeric hydroxy-terminated polyesters comprising Examples 12–19 was prepared by the melt reaction of resorcinol with a 1:1 mixture of diphenyl isophthalate and diphenyl terephthalate according to the method described in Example 11. Data for the oligomeric hydroxy-terminated polyesters of Examples 11–19 are gathered in Table 3. Values of weight average molecular weight, $M_w$, were determined by GPC using polystyrene molecular weight standards.

TABLE 3

HYDROXY TERMINATED POLYESTER OLIGOMERS

| Example | Mw oligomer[a] | % excess resorcinol | % phenol removed | Tg |
|---|---|---|---|---|
| 11 | 8,026 | 10 | 80 | 112° C. |
| 12 | 8327 | 10 | — | 115° C. |
| 13 | 9,891 | 10 | 86 | 118° C. |
| 14 | 14,400 | 10 | 93 | — |
| 15 | 5,511 | 32 | 98 | — |
| 16 | 11,080 | 10 | 95 | — |
| 17 | 1,306 | 100 | 93 | — |
| 18 | 5,209 | 32 | 95 | — |
| 19 | 7,541 | 10 | 93 | — |

[a]GPC determined $M_w$ using polystyrene standards

Block Copolymers by Solid State Polymerization

Example 20

A mixture prepared from 1.0 gram of the amorphous methyl salicylate-endcapped polycarbonate oligomer prepared in Example 1 ($M_w$=4820, $M_n$=2138), having a degree of polymerization of about 8.4, and 2 g of an ITR oligomer, prepared as in Example 11, having a degree of polymerization (DP) of about 9.2 as determined by quantitative $^{13}$C-

NMR and/or $^{31}$P-NMR of the dioxaphospholane derivative, was dissolved in methylene chloride. Ethyl acetate, in an amount corresponding to approximately twice the amount of methylene chloride, was added to crystallize and precipitate the mixture of oligomers from solution. The material thus precipitated was separated from the liquid phase by filtration. The liquid phase was then evaporated to dryness and the residue was combined with the solid recovered by filtration. After drying at about 60° C. in a vacuum oven overnight, the resulting powder was characterized by differential scanning calorimetry (DSC), which indicated a glass transition ($T_g$) at about 100° C. and two broad peaks corresponding to melting points at approximately 148° C. and 200° C., respectively. A portion of this mixture of partially crystalline methyl salicyl endcapped polycarbonate oligomer and ITR oligomer was reserved for use in Example 21. A second portion of the powder was then subjected to the following heating protocol under solid state polymerization conditions.

| Step | Temperature | Time | Total Time |
| --- | --- | --- | --- |
| 1 | 140° C. | 240 minutes | 240 minutes |
| 2 | 155° C. | 150 minutes | 390 minutes |
| 3 | 165° C. | 150 minutes | 540 minutes |

Following solid state polymerization the product block copolyestercarbonate was analyzed by DSC, and shown to possess a $T_g$ of about 129° C. and two broad peaks corresponding to melting points at approximately 187° C. and 208° C., respectively. GPC indicated a single peak with $M_w$=28000 daltons and $M_n$=9540 daltons using polystyrene standards. Quantitative $^{13}$C-NMR indicated a blocky copolymer with an average polycarbonate block length of about 4.05 and an average polyester block length of about 7.

Example 21

A portion of the powder mixture reserved for later use in Example 20 was subjected to the following heating protocol under solid state polymerization conditions.

| Step | Temperature | Time | Total Time |
| --- | --- | --- | --- |
| 1 | 140–160° C. | 185 minutes | 185 minutes |
| 2 | 165° C. | 25 minutes | 210 minutes |
| 3 | 170° C. | 20 minutes | 230 minutes |

GPC analysis of the product copolyestercarbonate indicated a single narrow peak with $M_w$=18880 and $M_n$=9230 using polystyrene standards. Quantitative $^{13}$C-NMR indicated a blocky copolymer with an average polycarbonate block length of about 4.15 and an average polyester block length of about 8.9.

Example 22

Methyl salicylate endcapped polycarbonate oligomer prepared in Example 1 ($M_w$=4820, $M_n$=2138, DP about 8.4) was dissolved in methylene chloride and subsequently precipitated by adding ethyl acetate in an amount corresponding to approximately 5 times the amount of methylene chloride employed. The precipitate was filtered from the liquid phase. The liquid phase was then evaporated to dryness to afford a solid residue. The precipitate and the solid residue from the liquid phase were then combined to form a mixture of the precipitate and the solid residue obtained by evaporation of the liquid phase. The mixture was ground and then shaken mechanically to afford a powder consisting essentially of partially crystalline methyl salicyl endcapped polycarbonate oligomer. The partially crystalline methyl salicyl endcapped polycarbonate oligomer was then ground and mixed together in a laboratory mill mixer for several minutes with an equal weight of a fine powder of oligomeric hydroxy-terminated polyester (Mw=8845 using polystyrene standards, DP=about 9.2) prepared using the methodology and proportions of Example 11. Upon analysis by DSC, the mixture of oligomers displayed a $T_g$ of about 105° C. and a broad peak corresponding to a melting temperature at about 170° C. A portion was reserved for use in Examples 23 and 24. A second portion of the mixture was subjected to the following heating protocol under solid state polymerization conditions.

| Step | Temperature | Time | Total Time |
| --- | --- | --- | --- |
| 1 | 150–170° C. | 90 minutes | 90 minutes |
| 2 | 170° C. | 90 minutes | 180 minutes |
| 3 | 180° C. | 80 minutes | 260 minutes |
| 4 | 185° C. | 60 minutes | 320 minutes |
| 5 | 200° C. | 30 minutes | 350 minutes |
| 6 | 205° C. | 90 minutes | 440 minutes |

The product copolyestercarbonate had a $T_g$ of about 135° C. and two broad peaks corresponding to melting points at approximately 169° C. and 221° C. respectively. GPC analysis of the product indicated a broad peak with $M_w$=79,830 and $M_n$=21,720 using polystyrene standards. Quantitative $^{13}$C-NMR indicated a blocky copolymer with an average polycarbonate block length of about 6.7 and an average polyester block length of about 8.6.

Example 23

A portion of the partially crystalline mixture of oligomers prepared in Example 22 was subjected to the following heating protocol under solid state polymerization conditions.

| Step | Temperature | Time | Total Time |
| --- | --- | --- | --- |
| 1 | 160–195° C. | 140 minutes | 140 minutes |
| 2 | 195° C. | 50 minutes | 190 minutes |
| 3 | 210–215° C. | 25 minutes | 215 minutes |
| 4 | 215° C. | 80 minutes | 295 minutes |

The product copolyestercarbonate had a $T_g$ of about 143° C. and three broad peaks corresponding to melting points at approximately 130° C., 161° C. and 243° C. respectively. GPC analysis of the product indicated a broad peak with $M_w$=73,540 and $M_n$=24,000 using polystyrene standards. Quantitative $^{13}$C-NMR indicated a blocky copolymer with an average polycarbonate block length of about 4.25 and an average polyester block length of about 6.4.

Example 24

A portion of the partially crystalline mixture of oligomers prepared in Example 22 was subjected to the following heating protocol under solid state polymerization conditions.

| Step | Temperature | Time | Total Time |
|---|---|---|---|
| 1 | 170–200° C. | 75 minutes | 75 minutes |
| 2 | 200° C. | 60 minutes | 135 minutes |

The product copolyestercarbonate had a $T_g$ of about 133° C. and two broad peaks corresponding to melting points at approximately 162° C. and 221° C. respectively. GPC analysis of the product indicated a broad peak with $M_w$=41,250 and $M_n$=14,020 using polystyrene standards. Quantitative $^{13}$C-NMR indicated a blocky copolymer with an average polycarbonate block length of about 5.65 and an average polyester block length of about 7.

Comparative Example 1

A sample of amorphous, oligomeric bisphenol A polycarbonate powder prepared by the melt reaction of bisphenol A with diphenyl carbonate having a weight average molecular weight ($M_w$) of about 5600 daltons, a number average molecular weight ($M_n$) of about 2300 daltons (DP about 9.1) was crystallized using isopropanol vapors according to the method described in U.S. Pat. No. 6,031,063. A partially crystalline oligomeric polycarbonate powder was obtained. The partially crystalline oligomeric polycarbonate had a percent endcapping of about 60 percent, meaning that 60 percent of the oligomer chain ends were phenoxy groups derived from diphenyl carbonate, and about 40 percent of the chain ends were hydroxy groups. A portion of the partially crystalline oligomeric polycarbonate was mixed together in a laboratory mill mixer for several minutes with an equal weight of a fine powder of oligomeric hydroxy-terminated polyester (DP=about 9.2 by $^{13}$C-NMR) prepared using the methodology and proportions of Example 11. The mixture was then subjected to the following heating protocol under solid state polymerization conditions.

| Step | Temperature | Time | Total Time |
|---|---|---|---|
| 1 | 170–200° C. | 75 minutes | 75 minutes |
| 2 | 200° C. | 60 minutes | 135 minutes |

The product resulting from solid state polymerization was subjected to GPC analysis which indicated a broad peak with $M_w$=13,020 and $M_n$=5,080 using polystyrene standards. Quantitative $^{13}$C-NMR indicated a blocky copolymer with an average polycarbonate block length of about 2.35 and an average polyester block length of about 4.3.

The data presented in Examples 20–24 illustrate the method of the present invention which provides blocky copolyestercarbonates under mild conditions. Comparative Example 1 illustrates the limitations of conventional solid state polymerization technology for the preparation of copolyestercarbonates. Data for Example 20–24 and Comparative Example 1 is given in Table 4.

TABLE 4

BLOCKY COPOLYESTERCARBONATES BY SSP

| Example | $M_w{}^a$ | $M_n{}^a$ | PC Block Length Observed[b]/ % Retention[c] | | ITR Block Length Observed[b]/ % Retention[c] | |
|---|---|---|---|---|---|---|
| 20 | 28000 | 9450 | 4.0 | 47.6% | 7 | 76.1% |
| 21 | 18880 | 9230 | 4.1 | 48.8% | 8.9 | 96.7% |
| 22 | 79830 | 21720 | 6.7 | 79.8% | 8.6 | 93.5% |
| 23 | 73540 | 24000 | 4.2 | 50.0% | 6.4 | 69.6% |
| 24 | 41250 | 14020 | 5.6 | 66.7% | 7 | 76.1% |
| CE-1 | 13020 | 5080 | 2.3 | 25.2% | 4.3 | 46.7% |

[a]Molecular weights determined by GPC using polystyrene standards.
[b]block length determined by $^{13}$C-NMR.
[c]% Retention of block length compared the DP of the starting oligomer to the average DP of the polycarbonate or polyester blocks present in the product copolyestercarbonate.

In Examples 20–24 between about 70 and about 97 percent of the initial polyester block length is preserved in the product copolyestercarbonate. For example, in Example 20 the average block length of the hydroxy-terminated ITR oligomer, also referred to as its degree of polymerization (DP), was about 9.2. The product copolyestercarbonate following solid state polymerization comprised polyester blocks (ITR blocks) having an average block length of about 7. Thus, about 76 percent of the original polyester block length is retained in the product copolyestercarbonate. Comparison of Examples 20–24 with Comparative Example 1 (CE-1) reveals not only more complete retention of the block lengths of the oligomeric starting materials, both polycarbonate and polyester, but much more rapid increase in molecular weight. Thus, the method of the present invention provides blocky copolyestercarbonates having substantial molecular weights ($M_w$'s from about 19000 to about 79000 daltons) whereas a much more random copolyestercarbonate having low molecular weight ($M_w$<15000 daltons) was obtained using a conventional solid state polymerization technique (Comparative Example 1).

The invention has been described in detail with particular reference to preferred embodiments thereof, but it will be understood by those skilled in the art that variations and modifications can be effected within the spirit and scope of the invention.

What is claimed is:

1. A molded article comprising a block copolyestercarbonate prepared by a method comprising the steps of contacting a partially crystalline polycarbonate starting material (A) comprising activated terminal aryloxy groups with at least one polymeric species (B), which is a polyester comprising reactive terminal hydroxy groups under solid state polymerization conditions, to afford a product block copolyestercarbonate.

2. An article according to claim 1 which is a multilayer article.

3. A molded article comprising a copolyestercarbonate prepared by a method comprising the steps of contacting a partially crystalline bisphenol A polycarbonate comprising terminal 2-methoxycarbonyl phenoxy end groups (IV)

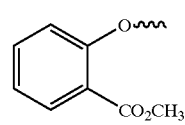

IV with at least one polyester comprising reactive hydroxyl groups under solid state polymerization conditions to afford a product copolyestercarbonate, wherein said partially crystalline bisphenol A polycarbonate is prepared by a method comprising melt reaction of bis(methyl salicyl)carbonate with bisphenol A.

4. An article according to claim 3 which is a multilayer article.

5. The article according to claim 2 wherein said partially crystalline polycarbonate starting material (A) comprises terminal aryloxy groups having structure I

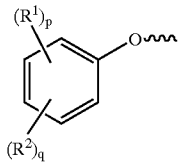

wherein $R^1$ is independently at each occurrence a $C_1$–$C_{20}$ aliphatic radical, $C_4$–$C_{20}$ cycloaliphatic radical, $C_4$–$C_{20}$ aromatic radical; $R^2$ is independently at each occurrence a halogen atom, nitro group, cyano group, $C_1$–$C_{20}$ alkoxycarbonyl group, $C_1$–$C_{20}$ acyl group, $C_4$–$C_{20}$ cycloalkoxycarbonyl group, $C_6$–$C_{20}$ aryoxycarbonyl group, $C_1$–$C_{20}$ alkylaminocarbonyl group, $C_2$–$C_{40}$ dialkylaminocarbonyl group, or a $C_1$–$C_{20}$ perfluoroalkyl group; p is an integer having a value 0 to 4, and q is an integer having a value of 1 to 5.

6. The article according to claim 2 wherein said partially crystalline polycarbonate starting material (A) comprises structural units derived from at least one dihydroxy aromatic compound and at least one diaryl carbonate II

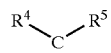

wherein $R^1$ is independently at each occurrence a $C_1$–$C_{20}$ aliphatic radical, $C_4$–$C_{20}$ cycloaliphatic radical, $C_1$–$C_{20}$ aromatic radical; $R^2$ is independently at each occurrence a halogen atom, nitro group, cyano group, $C_1$–$C_{20}$ alkoxycarbonyl group, $C_1$–$C_{20}$ acyl group, $C_4$–$C_{20}$ cycloalkoxycarbonyl group, $C_6$–$C_{20}$ aryoxycarbonyl group, $C_1$–$C_{20}$ alkylaminocarbonyl group, $C_2$–$C_{40}$ dialkylaminocarbonyl group, or a $C_1$–$C_{20}$ perfluoroalkyl group; p is an integer having a value 0 to 4, and q is an integer having a value of 1 to 5.

7. The article according to claim 6 wherein the diaryl carbonate II is selected from the group consisting of bis(2-methoxycarbonylphenyl) carbonate, bis(2-ethoxycarbonylphenyl) carbonate, bis(2-butoxycarbonylphenyl) carbonate, and bis(2,4,6-trifluorophenyl) carbonate.

8. The article according to claim 6 wherein said dihydroxy aromatic compound is a bisphenol having structure III

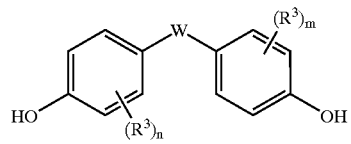

wherein $R^3$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group $$R^4\diagdown_{\,C\,}\diagup R^5$$

wherein $R^4$ and $R^5$ are independently a hydrogen atom, $C_1$–$C_{20}$ alkyl group, $C_4$–$C_{20}$ cycloalkyl group, or $C_4$–$C_{20}$ aryl group; or $R^4$ and $R^5$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

9. The article according to claim 2 wherein said partially crystalline polycarbonate starting material (A) comprises 2-methoxycarbonylphenoxy terminal aryloxy groups IV

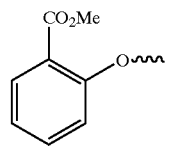

and structural units derived from bisphenol A.

10. The article according to claim 2 wherein said starting material (B) comprising reactive terminal hydroxy groups comprises structural units V

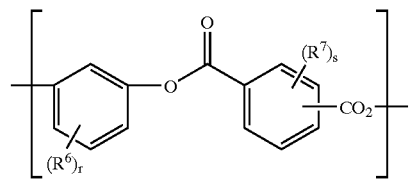

wherein $R^6$ and $R^7$ are independently at each occurrence a halogen atom, $C_1$–$C_{20}$ aliphatic radical, $C_4$–$C_{20}$ cycloaliphatic radical, or a $C_4$–$C_{20}$ aromatic radical, and r and s are independently integers having values from 0 to 4.

11. The article according to claim 10 wherein said polymeric species (B) comprising reactive hydroxy groups is a polyester comprising structural units VII

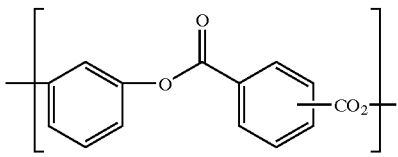

and having a degree of polymerization of at least about 4.

12. The article according to claim 2 wherein said partially crystalline polycarbonate starting material (A) has a percent endcap between about 50 and about 100 percent.

13. The article according to claim 2 wherein said starting material (B) is a copolymer prepared by heating in the absence of a catalyst, a mixture comprising resorcinol, diphenyl terephthalate, and diphenyl isophthalate.

14. The article according to claim 13 wherein said diphenyl terephthalate and said diphenyl isophthalate have a molar ratio, said molar ratio being in a range between about 1 to 10 and about 10 to 1.

15. The article according to claim 2 wherein said starting material (B) is a copolymer prepared by interfacial polymerization of resorcinol with terephthaloyl dichloride and isophthaloyl dichloride in the presence of a catalyst.

16. The article according to claim 15 wherein said terephthaloyl dichloride and said isophthaloyl dichloride have a molar ratio, said molar ratio being in a range between about 1 to 10 and about 10 to 1.

17. The article according to claim 2 wherein said starting material (A) has a crystallinity in a range between about 15 and about 40 percent.

18. The article according to claim 2 wherein said solid state polymerization conditions comprise heating at a temperature between about 100° C. about 240° C. for a period of between about 1 and about 10 hours.

19. The article according to claim 2 further comprising preparing a mixture of said starting materials (A) and (B).

20. The article according to claim 19 comprising dry mixing said starting material (A) with said starting material (B).

21. The article according to claim 19 comprising precipitating a mixture of said starting materials (A) and (B) from solution.

22. The article according to claim 2 wherein said starting materials (A) and (B) have a weight ratio in a range between about 0.01 and about 100 grams of starting material (A) per gram of starting material (B).

23. The article according to claim 2 wherein the product copolymer has a measurable degree of blockiness corresponding to blocklengths which are at least 50 percent longer than the corresponding random distribution of structural elements.

* * * * *